United States Patent
Frebel et al.

(10) Patent No.: US 11,088,634 B2
(45) Date of Patent: Aug. 10, 2021

(54) INVERTER WITH AC FORWARD BRIDGE AND IMPROVED DC/DC TOPOLOGY

(71) Applicant: CE+T Power Luxembourg SA, Troisvierges (LU)

(72) Inventors: Fabrice Frebel, Wandre (BE); Thierry Joannes, Flemalle (BE); Olivier Caubo, Liege (BE); Paul Bleus, Jupille (BE)

(73) Assignee: CE+T POWER LUXEMBOURG SA, Troisvierges (LU)

( * ) Notice: Subject to any disclaimer, the term of this patent is extended or adjusted under 35 U.S.C. 154(b) by 0 days.

(21) Appl. No.: 16/762,169

(22) PCT Filed: Nov. 7, 2018

(86) PCT No.: PCT/EP2018/080412
§ 371 (c)(1),
(2) Date: May 7, 2020

(87) PCT Pub. No.: WO2019/092000
PCT Pub. Date: May 16, 2019

(65) Prior Publication Data
US 2020/0366218 A1 Nov. 19, 2020

(30) Foreign Application Priority Data
Nov. 9, 2017 (EP) ..................... 17200739

(51) Int. Cl.
*H02M 7/797* (2006.01)
*H02M 3/156* (2006.01)
*H02M 3/335* (2006.01)

(52) U.S. Cl.
CPC ........... *H02M 7/797* (2013.01); *H02M 3/156* (2013.01); *H02M 3/33538* (2013.01)

(58) Field of Classification Search
CPC .. H02M 7/797; H02M 3/156; H02M 3/33538; H02M 1/4283; H02M 7/493; H02M 3/33576; H02M 1/342; Y02B 70/10
See application file for complete search history.

(56) References Cited

U.S. PATENT DOCUMENTS 5,561,595 A * 10/1996 Smith ................. H02M 1/4241
363/37
5,734,563 A 3/1998 Shinada
(Continued)

FOREIGN PATENT DOCUMENTS

EP 1852964 A1 11/2007
EP 2270624 A2 1/2011
(Continued)

OTHER PUBLICATIONS

Fukuda, et al., "Control Strategy for a Three Phase Series-Connected Hybrid Inverter System," 32nd Annual IEEE Power Electronics Specialists Conference 2: 968-973 (Jan. 1, 2001). XP055544880.
(Continued)

Primary Examiner — Kyle J Moody
Assistant Examiner — Lakaisha Jackson
(74) Attorney, Agent, or Firm — Leydig, Voit & Mayer, Ltd.

(57) ABSTRACT

A DC-to-AC power converter having a main DC input and a main single-phase AC output, configured to convert and adapt a DC voltage at the main DC input into a sinusoidal AC voltage of a fundamental frequency at the main AC output and to deliver a rated power at the main AC output to a load includes: a single DC-to-DC converter having as input the main DC input and having a DC output and a tank capacitor being connected to the DC output, two low frequency diodes biased so as to be able to pass current from, respectively to, the DC output to, respectively from, the tank
(Continued)

capacitor; and, according to a direct path, a bidirectional voltage-type DC-to-AC converter in cascade with the DC-to-DC converter, the bidirectional voltage-type DC-to-AC converter having a DC input-output connected to the DC output and an AC output-input connected to the main AC output.

15 Claims, 7 Drawing Sheets

(56) References Cited

U.S. PATENT DOCUMENTS

| | | |
|---|---|---|
| 7,710,752 B2 | 5/2010 | West |
| 7,778,046 B1 | 8/2010 | Cuk et al. |
| 2002/0135419 A1* | 9/2002 | Groves, Jr. .......... H03F 3/2173 330/10 |
| 2013/0223106 A1 | 8/2013 | Mayell |
| 2017/0025962 A1 | 1/2017 | Davidson |

FOREIGN PATENT DOCUMENTS

| | | |
|---|---|---|
| JP | 2003164149 A | 6/2003 |
| WO | WO 2016083143 A1 | 6/2016 |

OTHER PUBLICATIONS

Weinberg, et al., "An Assessment of the Use of Resonant-Mode Topologies for High Frequency Power Conversion," *European Space Power Conference* 1: 331-337 (Oct. 2, 1989). XP000163968.

\* cited by examiner

INVERTER WITH AC FORWARD BRIDGE AND IMPROVED DC/DC TOPOLOGY

CROSS-REFERENCE TO PRIOR APPLICATIONS

This application is a U.S. National Phase application under 35 U.S.C. § 371 of International Application No. PCT/EP2018/080412, filed on Nov. 7, 2018, and claims benefit to European Patent Application No. EP 17200739.5, filed on Nov. 9, 2017. The International Application was published in English on May 16, 2019 as WO/2019/092000 under PCT Article 21(2).

FIELD

The present invention is related to an efficiency-improved DC/AC power converter comprising a main path made of a DC/DC converter followed by a bidirectional voltage-type DC/AC converter and a bypass path made of a current-type DC/AC converter, in which the power peak is delivered by the bypass converter for minimizing the losses.

In particular, the present invention is an improvement of the DC/AC power converter described in document WO 2016/083143 A1.

BACKGROUND

A classical inverter topology is shown on FIG. 1. A DC/DC input stage, (galvanically) isolated or not, converts an input DC voltage into a different DC voltage well suited for supplying an output non isolated DC/AC inverter bridge classically working in a frequency range going from several kHz to several MHz and generating an output 50 Hz or 60 Hz sinewave by typically using a high frequency PWM modulation.

In order to improve efficiency, document U.S. Pat. No. 7,710,752 B2 shows a parallel configuration with one path build around a boost & bridge converter and another direct path build around a simple bridge converter.

The problem with that topology is that the most efficient direct path can only be activated when the instantaneous voltage of the output is low enough. It cannot be activated when the instantaneous power need is maximum. Efficiency improvement is not optimal regarding the number of components to be added.

Document EP 2 270 624 A1 presents another solution to optimize efficiency by alternately connecting three current generators (with different characteristics) to three output phases based on what connection is optimum to maximize efficiency. This topology can only be applied to three-phase output systems and the question of insulation is not addressed.

Document WO 2016/083143 A1 presents an isolated DC-to-AC converter that provides efficiency improvement by adding a direct path from the DC input to the AC output. This approach improves the efficiency but its disadvantage is that it requires an extra switching converter or extra windings in the isolated DC/DC converter transformer.

Document U.S. Pat. No. 7,778,046 B1 presents an interesting solution to improve efficiency of a DC/DC converter that can be used in an inverter to perform the required insulation. FIG. 35a is especially representative thereof. Despite a very interesting mode of operation, this invention has several drawbacks:

the converter does not fully operate in soft switching operation which prevents the use of high operating frequencies;

the switch S is not protected against over-voltages (no clamping effect present);

diode CR2 is not protected against over-voltage. As switch S is closed (or switched ON), the capacitor C2 continues to be charged by a current flowing in the leakage inductance of the transformer, diode CR2 being blocked as an overvoltage appears at the terminals of diode CR2 (after its reverse recovery phase), which can be several times the diode blocking voltage and which can destroy diode CR2. Moreover the possible clamping effect of diode CR1 is cancelled by the series inductance Lr, as overvoltage occurs thereon at the time of switch S closing. This problem renders difficult to increase the power as wanted.

Document EP 1 852 964 A1 discloses a maximum single-phase inverter 3B-INV that uses as its DC power source a DC voltage V3B boosted from a solar light voltage by a boosting chopper circuit, which is arranged at the center, and single-phase inverters 2B-INV and 1B-INV that use DC power sources V1B and V2B supplied from this maximum DC power source V3B as their inputs are arranged on both sides of the maximum single-phase inverter 3B-INV. AC sides of the respective single-phase inverters are connected in series. A power conditioner is thus configured to provide an output voltage by using the sum of the generated voltages of the respective single-phase inverters. Chopper circuits are connected between the maximum DC power source V3B and the DC power sources V1B and V2B, and power is supplied to the DC power sources V1B and V2B from the maximum DC power source V3B via switching devices in the single-phase inverters.

Document US 2017/025962 A1 discloses two versions of an isolated single stage converter AC/DC Power Factor Corrected (PFC) converter topology. One is with a full bridge rectifier at its input and the other is a True Bridgeless version. The two versions of the topology feature new configurations and circuitry including a simplified damper circuit and a clamp capacitor flipping circuit and control methods that allow them to realize improved single stage isolated power factor converters which are suitable for high power operation, feature Zero Voltage Switching to maximize conversion efficiency and to minimize Electro-Magnetic Interference generation, do not need an additional circuit to limit the inrush current, achieve reasonably low input current Total Harmonic Distortion (THD), and are easy to control. The second version provides a true bridgeless single stage isolated power factor converter with even higher efficiency and lower input current THD.

Document US 2013/223106 A1 discloses a switching circuit for use in a power converter including a first active switch coupled between a first terminal of an input of the power converter and a first terminal of a primary winding of a transformer. A second active switch is coupled between a second terminal of the input and a second terminal of the primary winding. An output capacitance of the first active switch is greater than an output capacitance of the second active switch. A first passive switch is coupled between the second terminal of the primary winding and the first terminal of the input. A second passive switch is coupled between the second terminal of the input and the first terminal of the primary winding. A reverse recovery time of the first passive switch is greater than a reverse recovery time of the second passive switch.

SUMMARY

In an embodiment, the present invention provides a DC-to-AC power converter having a main DC input and a main single-phase AC output, configured to convert and adapt a DC voltage at the main DC input into a sinusoidal AC voltage of a fundamental frequency at the main AC output and to deliver a rated power at the main AC output to a load, comprising: a single DC-to-DC converter having as input the main DC input and having a DC output and a tank capacitor being connected to the DC output, two low frequency diodes biased so as to be configured to pass current from, respectively to, the DC output to, respectively from, the tank capacitor; according to a direct path, a bidirectional voltage-type DC-to-AC converter in cascade with the DC-to-DC converter, the bidirectional voltage-type DC-to-AC converter having a DC input-output connected to the DC output and an AC output-input connected to the main AC output; according to a bypass path, and in parallel to the bidirectional voltage-type DC-to-AC converter and to the low frequency diodes, a current-type low frequency full switching H-bridge comprising an AC forward bridge, having a DC input and an AC output, the DC input being connected to the DC output of the single DC-to-DC converter and the AC output being connected in parallel to the main AC output, the AC forward bridge having a working frequency less than 1 kHz; and a controller configured to control the bidirectional voltage-type DC-to-AC converter to deliver at the first AC output-input the sinusoidal AC voltage and to control the AC forward bridge to deliver a quasi square-type AC forward current in phase with the sinusoidal AC voltage, the control device being configured to control the bidirectional voltage-type DC-to-AC converter and the AC forward bridge, so that the latter are operable simultaneously, wherein, when an instantaneous voltage between the terminals of the main AC output attains a predetermined level, the low frequency forward AC bridge is switched on, the low frequency diodes being reverse biased and non-conducting and a constant power is supplied by the DC-to-DC converter directly to the load.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
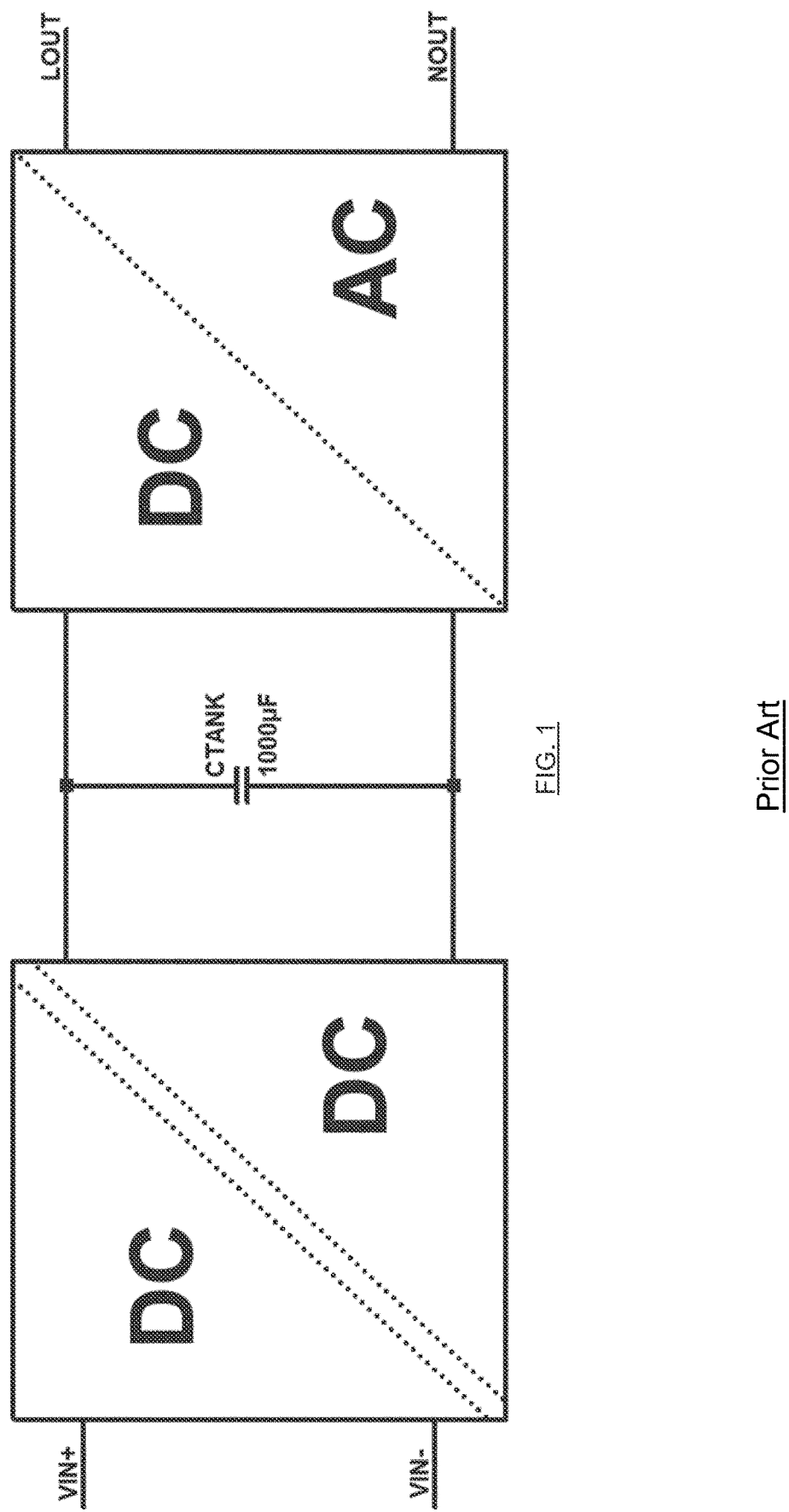
FIG. 1 schematically represents an inverter topology according to prior art.

In an embodiment, the present invention provides an inverter that converts a wide range of DC input voltages into an AC output voltage with an efficiency as high as possible while maintaining stringent requirement regarding input DC current shape.

In particular, an embodiment of the invention maintains a constant DC input current, and therefore a constant input power, even if the AC output power is fluctuating during the 50 Hz/60 Hz AC period.

An embodiment of the invention makes the inverter as compact as possible.

A first aspect of the present invention relates to a DC-to-AC power converter having a main DC input and a main single-phase AC output, capable to convert and adapt a DC voltage at said main DC input into a sinusoidal AC voltage of fundamental frequency $f_0$ at said main AC output and capable to deliver a rated power at said main AC output to a load, comprising:

a single DC-to-DC converter having as input said main DC input and having a DC output and a tank capacitor being connected to said DC output, two low frequency diodes biased so as to be able to pass the current from, respectively to, the DC output to, respectively from, the tank capacitor;

according to a direct path, a bidirectional voltage-type DC-to-AC converter in cascade with the DC-to-DC converter, said bidirectional voltage-type DC-to-AC converter having a DC input-output connected to the DC output and an AC output-input connected to said main AC output;

according to a bypass path, and in parallel to said bidirectional voltage-type DC-to-AC converter and to said low frequency diodes, a current-type low frequency full switching H-bridge, called hereafter AC forward bridge, having a DC input and a AC output, said DC input being connected to said DC output of the single DC-to-DC converter and said AC output being connected in parallel to said main AC output, said AC forward bridge having a working frequency less than 1 kHz, and preferably 400 Hz or 50/60 H;

a control device for controlling said bidirectional voltage-type DC-to-AC converter to deliver at said first AC output-input the sinusoidal AC voltage and for controlling said AC forward bridge to deliver a quasi square-type AC forward current in phase with said sinusoidal AC voltage, said control device being capable to control said bidirectional voltage-type DC-to-AC converter and said AC forward bridge, so that the latter are capable to be operated simultaneously;

so that, when the instantaneous voltage between the terminals of said main AC output attains a predetermined level, the low frequency forward AC bridge is switched on, the low frequency diodes being reverse biased and non-conducting and a constant power is supplied by the DC-to-DC converter directly to the load.

According to preferred embodiments, the DC-to-AC power converter of the invention is such that:

the two closed switches (TPH, TNL; TPL, TNH) of the low frequency AC forward bridge are selected depending of the polarity of the output AC voltage;

the DC-to-DC converter is designed to support a variable output voltage while transferring a nearly constant power;

the DC-to-DC converter is isolated and comprises, at the primary side of the transformer, an active clamp, made of a main MOSFET (MP) connecting the primary winding (TFO-P) of a transformer to a primary source (VIN+, VIN−) providing the main DC input, a resonance capacitance (CRP) being in parallel with the primary MOSFET (MP) to allow the primary MOSFET (MP) to operate in ZVT, and a capacitance (CAUX) and a second MOSFET (MAUX)

arranged to provide voltage clamping on the main MOSFET (MP) and consequently protect the latter against overvoltage;

the DC-to-DC converter is isolated and comprises, at the primary side of the transformer, a two-transistor forward converter primary stage, made of two MOSFETs (MP1, MP2), each directly connecting at one respective end thereof an end of the primary winding (TFO-P) of a transformer and a respective primary source terminal (VIN−, VIN+) providing the main DC input, a resonance capacitance (CRP1, CRP2) being in parallel with each MOSFET (MP1, MP2) respectively, to allow said MOSFETs (MP1, MP2) to operate in ZVT, and diodes (DAUX1, DAUX2) arranged to respectively connect each of the MOSFETs (MP1, MP2) to the primary source terminal (VIN+, VIN−) which is not the primary source terminal (VIN−, VIN+) directly connected to the corresponding MOSFET (MP1, MP2) respectively;

the DC-to-DC converter further comprises, at the secondary side of the transformer, at least a first capacitor (CS1, CS2) creating an AC connection to a secondary winding (TFO-S) of the transformer, a resonance inductance (LR) that can be reduced to the leakage inductance of the transformer, a rectifying diode (DR) and a free-wheeling diode (DLR) for rectifying the voltage created at the secondary of the transformer and a secondary resonance capacitor (CRS) connected in parallel with the rectifying diode (DR) and a decoupling capacitor (CS3) in parallel with the terminals of the output DC voltage;

the first capacitor (CS1), the resonance inductance (LR), the rectifying diode (DR) and the free-wheeling diode (DLR) are arranged so that, during the magnetization phase of the transformer, the input voltage of the converter, VIN, reflected to the secondary of the transformer as NVIN, with N being the transformer turn ratio, charges the first capacitor (CS1) and creates a resonance between the latter and the resonance inductance (LR), through the rectifying diode (DR), the free-wheeling diode (DRL) being non conducting, and without overvoltage at a junction between the rectifying diode (DR) and the free-wheeling diode (DRL);

the first capacitor (CS1), the resonance inductance (LR), the rectifying diode (DR) and the free-wheeling diode (DLR) are arranged so that, during the demagnetization phase of the transformer, a current flows from the charged first capacitor (CS1) to the load through the resonance inductance (LR) and the free-wheeling diode (DRL), said current transferring not only the magnetization energy of the transformer but also, simultaneously, the energy stored in the magnetization phase in the first capacitor (CS1);

the output power ($P_O$) of the DC/DC converter is related to the output power ($P_{FB}$) of an equivalent flyback converter by the following equation:

$$P_O = P_{FB}M, \text{ where } M = \frac{V_O}{V_O - NV_{IN}},$$

wherein $V_{IN}$ and $V_O$ are respectively the input and output voltages of the DC/DC converter, M being a multiplication factor higher than 1, preferably higher than 2;

the DC-to-AC power converter is bidirectional;

the low frequency diodes are replaced by controlled switches;

the controlled switches are MOSFET's, IGBT's or relays;

the DC-to-DC converter is non isolated.

DESCRIPTION OF A PREFERRED EMBODIMENT OF THE INVENTION

Figure 2:
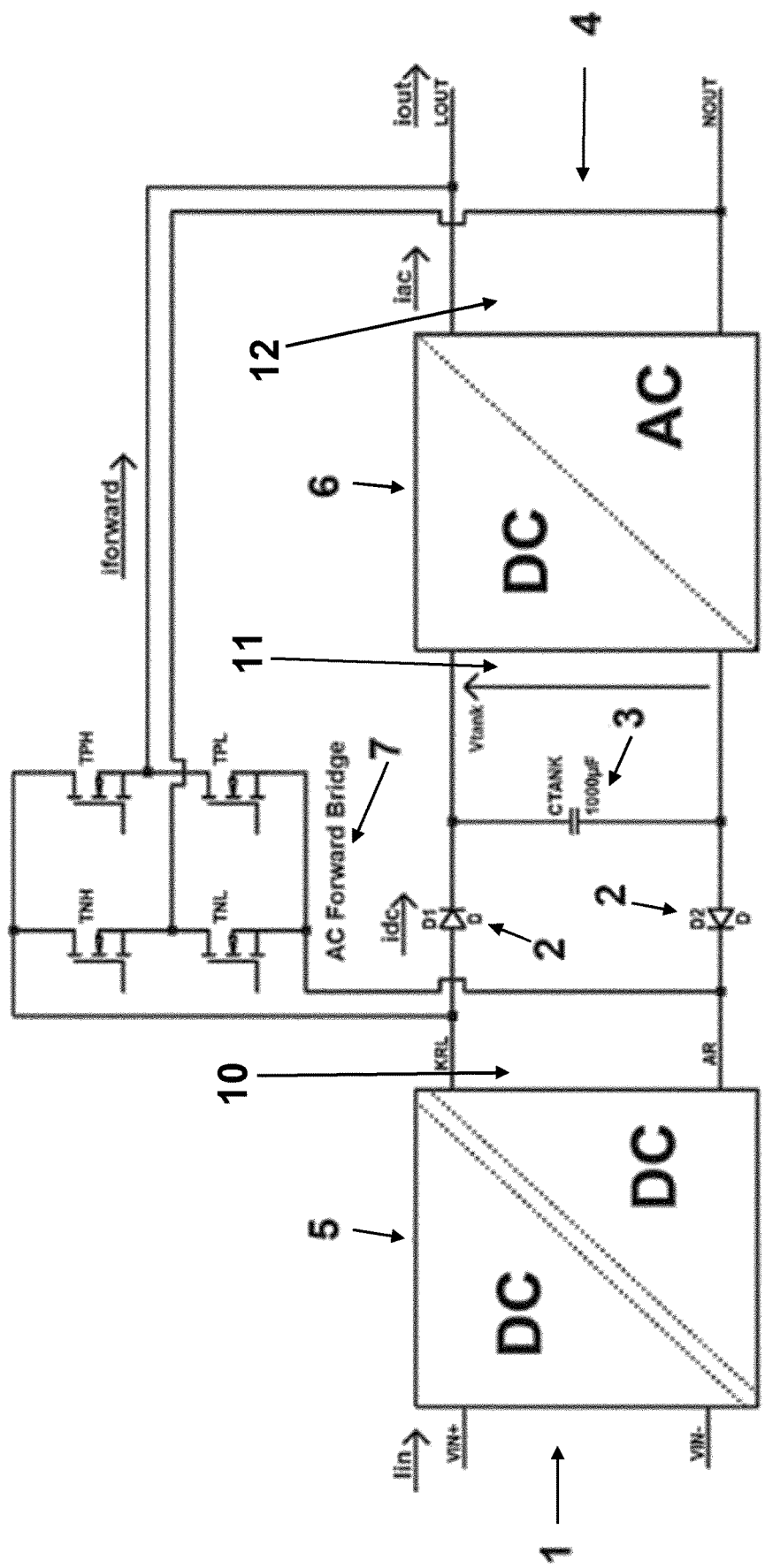
FIG. 2 schematically represents the principle of the efficiency-improved DC/AC power converter according to the present invention.

The solution proposed by the invention is presented in FIG. 2.

An isolated DC/DC converter 5 transfers power in a constant power mode from the DC input (typically 48 Vdc) to the tank voltage (typically 400 Vdc). The low frequency diodes 2 allow the current to flow to the tank capacitor 3. A DC/AC converter 6, which typically is a full-bridge converter, transforms the DC voltage into an AC sinewave, which typically is a 50 Hz or 60 Hz sinewave.

During the time evolution of the output sinewave voltage, whenever the instantaneous output voltage between node LOUT and node NOUT is high enough, i.e. typically 200 V, a low frequency "AC Forward Bridge" 7 can be switched ON, D1 and D2 diodes 2 automatically getting reverse biased (non conducting) and a constant power supplied by the DC/DC converter 5 is then directly provided to the load.

The DC/AC converter has only to provide the remaining/supplementing part of the power and therefore operates at lower power level and with lower losses.

It should be noted that the two switches (TPH/TNL or TNH/TPL) of the low frequency "AC Forward Bridge" 7 that are switched ON are selected depending on the polarity of the output voltage.

An advantage of this topology is that the efficiency of the DC/DC+AC Forward Bridge is far higher than the efficiency of the DC/DC+DC/AC path because the AC Forward Bridge 7 operates at low frequency and does not require output inductors. As the switching frequency is low (typically 100 Hz), commutation losses are low and the bridge efficiency is only limited by the conduction losses in the switches and can be increased by putting switches in parallel. As the effective resistance is the resistance of one switch divided by the number of switches in parallel, increasing the number of switches in parallel actually allows to decrease conduction losses.

Operation Principle of the AC Forward Bridge

Figure 3:
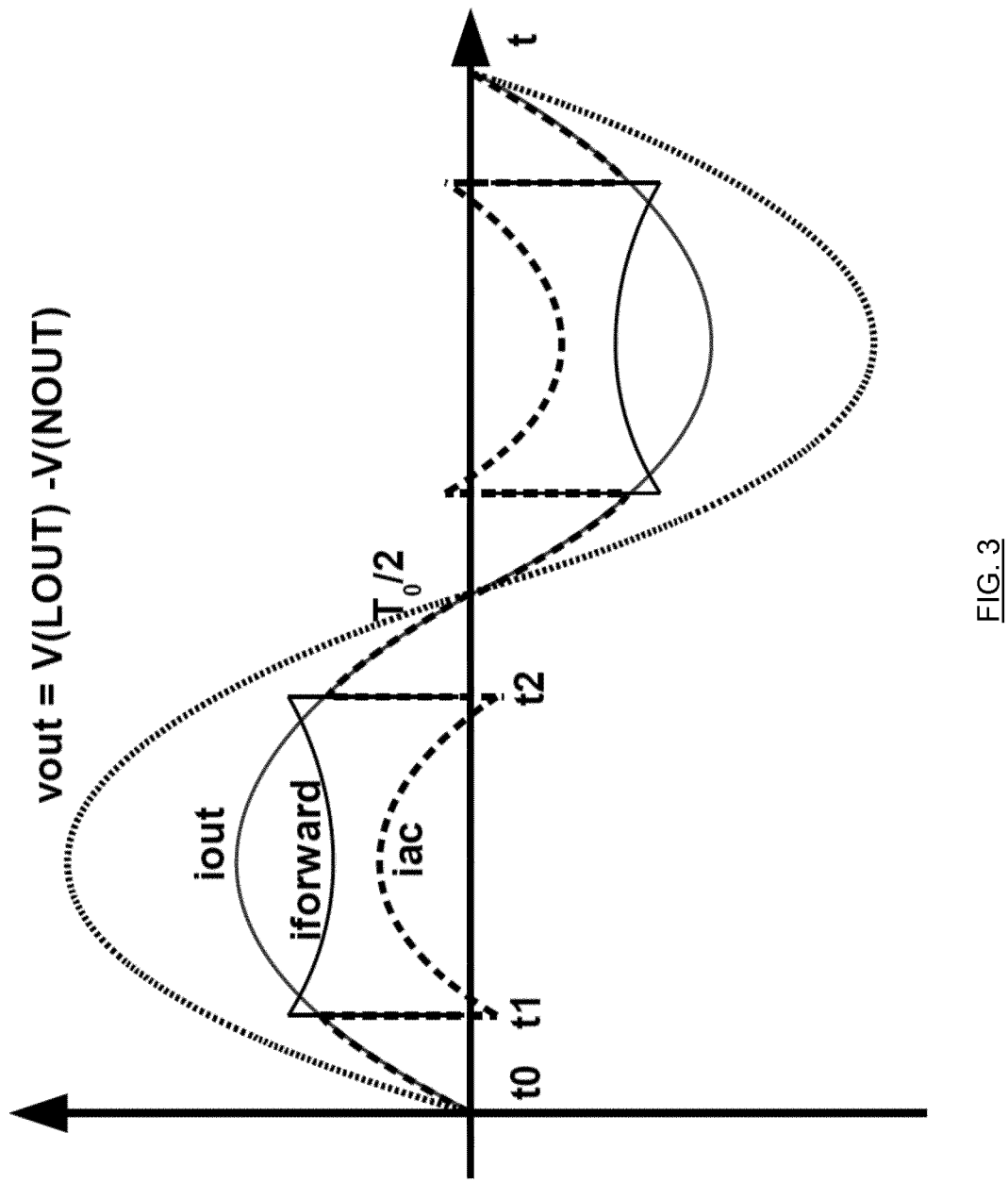
FIG. 3 shows typical waveforms in the case of the power converter of FIG. 2.

FIG. 3 shows typical voltage and current waveforms of the converter presented in FIG. 2.

The output voltage vout is set up by the DC/AC converter 6 by methods well known of those skilled in the art of power electronics and inverters.

From t0 to t1, the AC forward bridge is disconnected and converters 5 and 6 operates as in the prior art. Diodes D1 and D2 (diodes 2) are conducting.

At t1, the output voltage vout, that is equal to V(LOUT)−V(NOUT), is sufficiently high to allow the AC Forward Bridge 7 to transfer power directly to the output; therefore, the AC Forward Bridge 7 is switched ON. As vout is positive, transistors TPH and TNL are switched ON during interval t1 to t2.

During interval t1 to t2, some relations exist:

vout is lower than Vtank and TPH and TNL are switched ON, therefore, diodes D1 and D2 are OFF and idc is equal to 0;

iforward is generated directly by the isolated DC/DC converter that has to maintain a constant power at its input (requirement). Therefore, iforward*vout represents a constant power. This law determines the shape of iforward;

the output current has to be supplied to the load, therefore iac=iout−iforward. This law determines the shape of iac.

As can be seen on FIG. 3, iac is far lower than iout in this time interval, which explains why overall losses are reduced.

At t2, transistors TPH and TNL are switched OFF and the converter resumes to "normal operation", i.e. operation similar to the operation during t0 and t1. Diodes D1 and D2 (diodes 2) are again conducting during this interval.

After $T_0/2$, the next half-cycle starts and vout is negative, the operation sequence is similar to that described above except for transistors TPL and TNH that are switched ON instead of transistors TPH and TNL.

DC/DC Converter
Description

As explained above, the efficiency of the AC Forward Bridge 7 is only limited by its conduction losses and is thus very high. The overall inverter efficiency is therefore mainly impacted by the efficiency of the DC/DC converter. To support the proposed structure of FIG. 2, we have to implement an efficient DC/DC converter that is able to support a variable output voltage while transferring a nearly constant power. The invention proposes an efficient converter that fulfil the above requirement. An example of such a converter is described in U.S. Pat. No. 7,778,046 B1 but has some drawback as explained above. One purpose of the invention is to address these drawbacks in a simple way.

Figure 4:
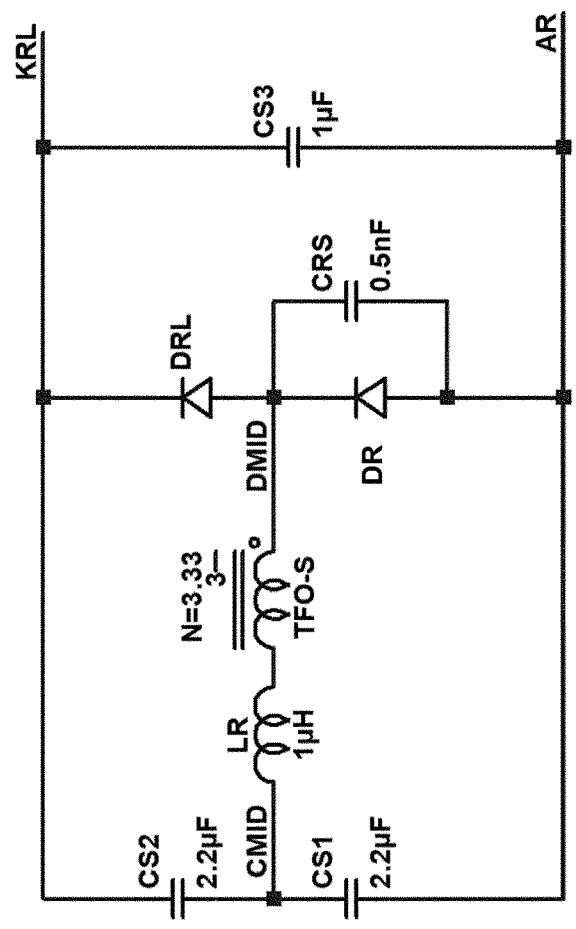
FIG. 4 shows the circuit topology for a particular embodiment according to the present invention.
Figure 4:
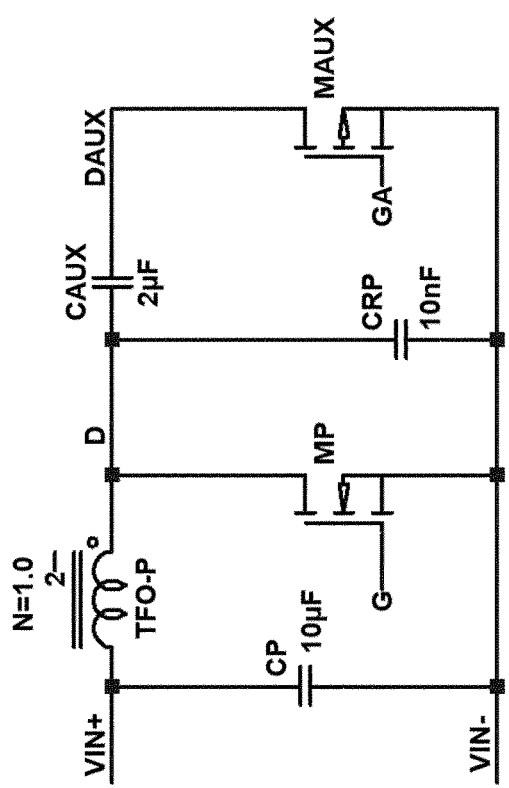

One embodiment of the invention is the circuit topology as shown on FIG. 4.

TFO-P and TFO-S are respectively the primary and secondary windings of a transformer.

MP is the main primary MOSFET that connects the transformer to the primary source. CRP is a resonance capacitance placed in parallel with MP and allowing the primary MOSFET MP to operate in ZVT (zero voltage transition). CAUX and MAUX respectively provide voltage clamping and protect MP against over-voltage. This part of the circuit is known in the art under the name of "Active Clamp". Finally CP is a primary side decoupling capacitor.

In this application, the term ZVT for "zero voltage transition" will be used instead of ZVS, for "zero voltage switching", as the transition is over the whole period (in order to invert the magnetizing current), rather than over on short time interval.

On the secondary side, capacitors CS1 and CS2 create an AC connection to the transformer. The secondary transformer winding is TFO-S. LR is a resonance inductance which typically represents the leakage inductance of the transformer. The voltage created at the secondary of the transformer is rectified by DR (rectifying diode) and DRL (free-wheeling diode). CRS is a secondary resonance capacitor connected directly across diode DR. CS3 is an output decoupling capacitor.

It should be noted that the arrangement of CS1, CS2 and CS3 can be modified without modifying the principle of the proposed circuit.

The DC/AC converter of the invention has only one DC/DC converter while it is not the case in prior art (the transformer of the DC/DC converter having for example several secondaries). The invention has thus the advantage to reduce the number of electronic components.

Operating Principle

Figure 5:
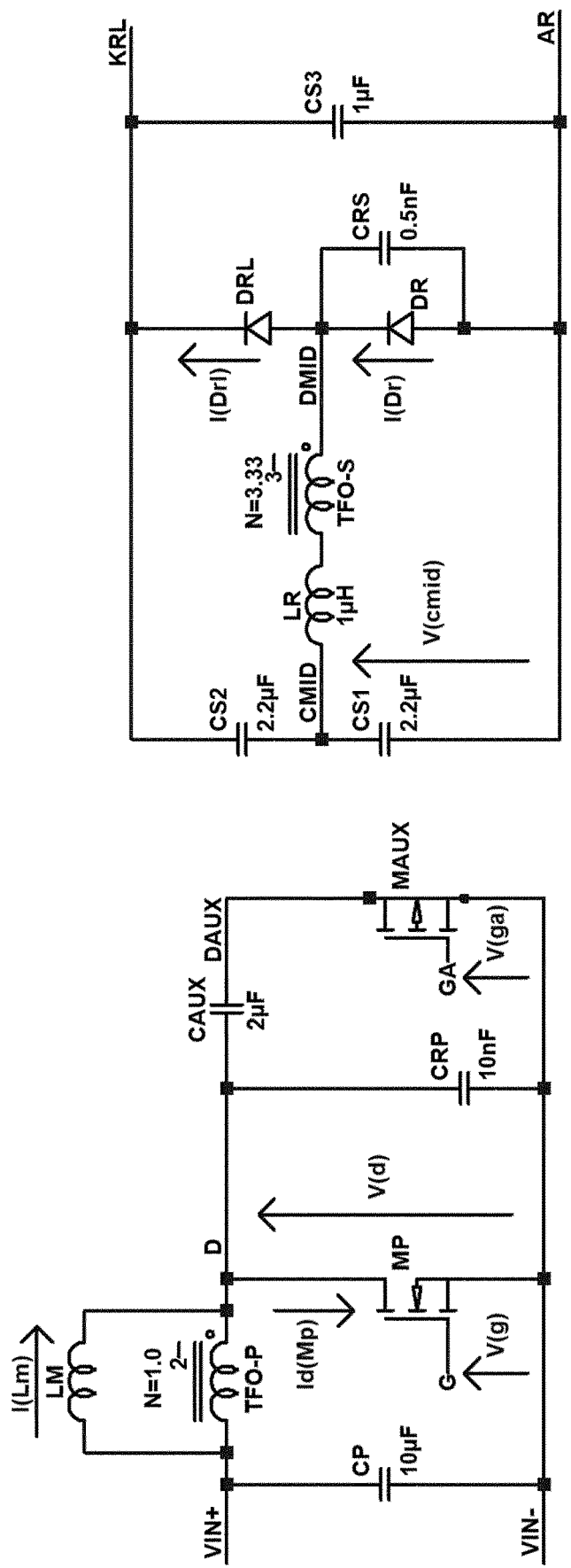
FIG. 5 is the circuit topology of FIG. 4 with the variables allowing operation analysis.

FIG. 5 shows the circuit whose operation will be further analysed. LM is an inductance that models the magnetizing inductance of the transformer seen from the primary side. The corresponding waveforms are displayed on FIG. 6.

Note that the values of CP (typically 10 uF), CAUX (typically 2 uF) and CS3 (typically 1 uF) are very high and the respective voltages on these capacitors, namely VIN, VOUT/N and VOUT are approximately constant. One should also take in consideration that each MOSFET (MP, MAUX) has an intrinsic reversed-biased diode. When MP opens, the potential at D increases but is limited by VOUT/N which is the voltage on CAUX. Above this value the intrinsic diode of MAUX will be ON.

Figure 6:
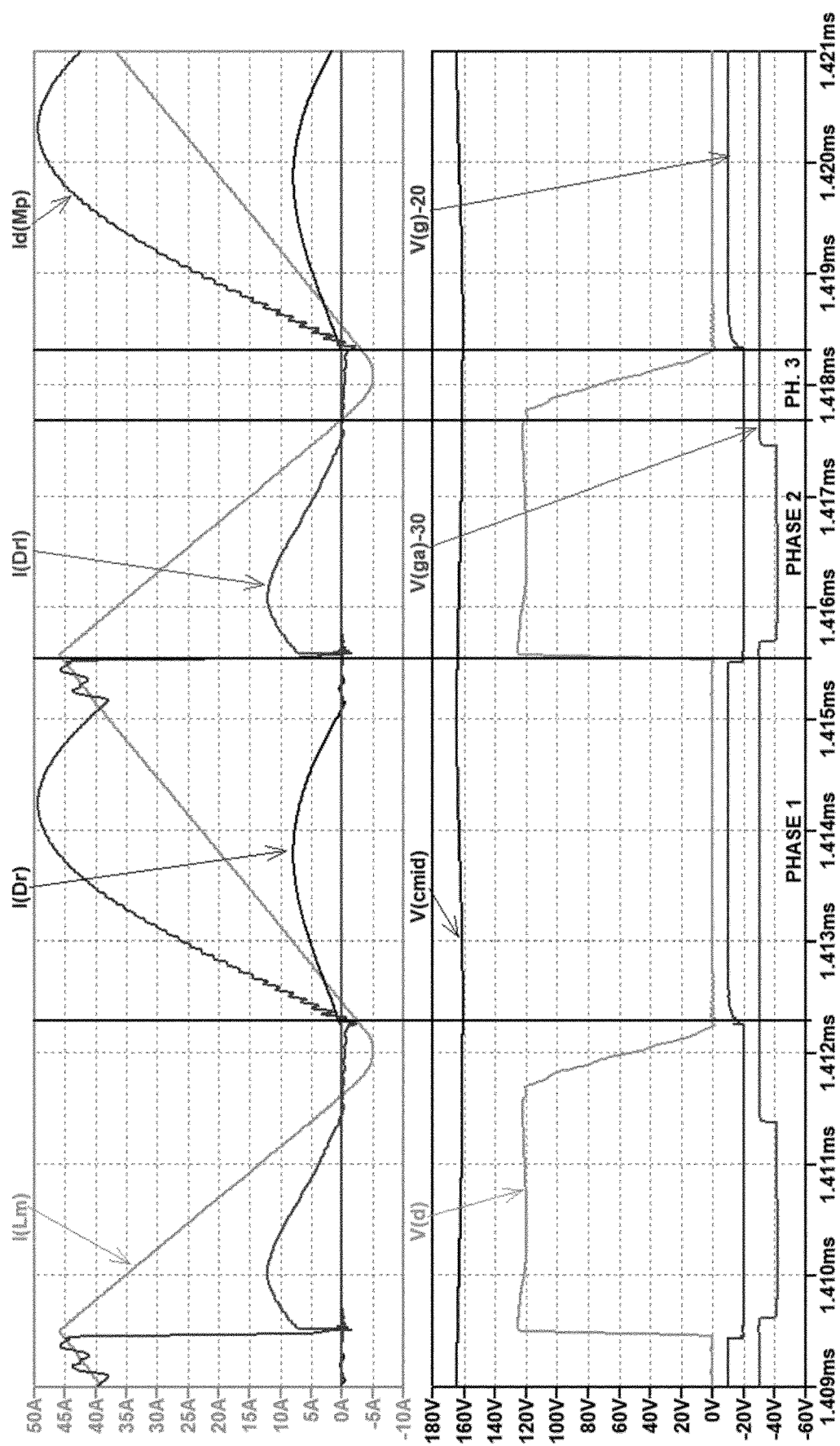
FIG. 6 shows the characteristic voltage and current waveforms in the 3-phase operation of the circuit depicted in FIG. 5.

The circuit operation is basically divided in 3 phases (see FIG. 6).

Phase 1:

In PHASE 1, the primary MOSFET voltage V(d) is zero. At the beginning of this phase, V(d) has reached zero naturally and relatively slowly and the primary MOSFET MP can thus be switched ON at zero voltage. Note that the gate voltages of the MOSFET Vg and Vga have been arbitrarily vertically shifted on FIG. 6 for the sake of clarity. During this phase, the magnetizing current I(Lm) rises linearly. It should be noted that the supply voltage VIN is reflected to the secondary of the transformer. This voltage is applied across CS1 and creates a resonance with LR that guarantees a fixed voltage across CS1 that is equal to VIN*N at CMID, where N is the transformer turn ratio. As for the flyback converter, the energy of the transformer is also stored during this phase, but charging capacitor CS1 allows some additional energy transfer and available power density increases. FIG. 6 shows that the voltage on the CS1 capacitor, V(cmid), is nearly constant with a small ripple of positive slope during PHASE 1. The charge current of CS1 is exactly I(Dr). The current in diode DR is a part of a resonant sinewave and comes back to 0 before the end of PHASE 1, i.e. before the opening of the main primary MOSFET MP. Therefore, diode DR switches OFF at zero current. Diode DRL is not conducting in PHASE 1.

Phase 2

The main primary MOSFET MP opens, according to the desired power level, the voltage V(d) quickly rises, the internal diode of the auxiliary MOSFET MAUX clamps the voltage V(d), which decreases a bit during PHASE2. During this phase, the magnetizing current I(Lm) decreases linearly to 0. It should be noted that the capacitor CRP across MP limits the slew rate dV/dt of the voltage V(d) and helps MP to open softly. The current in diode DRL does not follow the magnetizing current at the beginning of PHASE 2 since capacitor CAUX clamps V(d). It takes time up to the current in resonant inductance LR increases. This corresponds to the time needed for the current passing completely to the secondary. Finally I(DRL) decreases as the magnetizing current. During PHASE2, the auxiliary MOSFET MAUX can be switched ON to guarantee charge balance of capacitor CAUX. It should be remembered that gate voltage V(ga) has to be negative to switch MAUX ON because it is a P-type MOSFET (according to FIG. 5). Both MOSFET drivers can thus be commanded relatively to the same potential (ground). At the end of this phase, the magnetizing current I(Lm) reaches 0. At the same time the current in DRL reaches also 0 leading to a zero current switching of DRL.

Phase 3

The magnetizing current reverses and a resonance occurs between the magnetizing inductance LM and an equivalent resonance capacitor. The equivalent capacitor is the combination of CRP and CRS that are connected in parallel through the transformer. During this resonance, the voltage V(d) decreases softly and reaches 0. This allows the next PHASE1 to start by switching the primary MOSFET MP at zero voltage.

Figure 7:
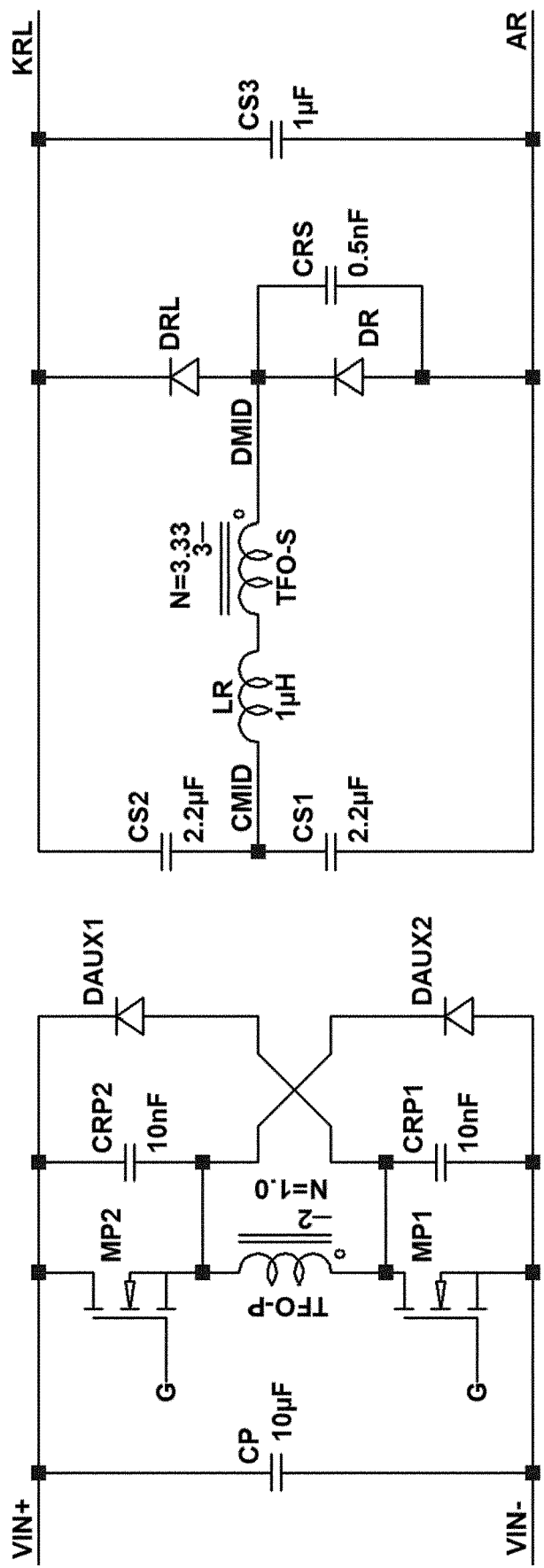
FIG. 7 shows a topology according to another embodiment of the invention wherein the entry stage of the topology of FIG. 5 has been replaced by the entry stage of a two-transistor forward converter.

According to an alternate embodiment of the invention shown on FIG. 7, the entry stage of the topology of FIG. 5 is replaced by the entry stage of a two-transistor forward (or two-transistor flyback) converter, this topology being know in prior art. The main primary MOSFET MP is replaced by two primary MOSFETs MP1, MP2 and the active clamp components made of clamp capacitor CAUX and auxiliary MOSFET MAUX is replaced by two corresponding diodes DAUX1, DAUX2. The resonance capacitance CRP placed in parallel with MP is replaced by resonance capacitances CRP1, CRP2 placed in parallel with the primary MOSFETs MP1 and MP2 respectively. The operation of the above topology is very similar with the one of the above topology (FIG. 5).

Two-transistor forward converters are usually utilized for dealing with higher input voltages.

Advantages of the Invention

Soft Switching and Compactness

It is well admitted by those skilled in the art that the use of high frequency in operating DC/DC converters is a key factor to achieve compactness. However, use of higher frequency also means an increase in switching losses. From the above phases description, it appears that the circuit is optimum regarding switching losses because both MOSFETs switch at zero voltage and both diodes switch OFF (or get reverse-polarized) at zero current. The proposed circuit is therefore well adapted to build a very compact converter.

Efficient Power Control and Transfer

As schematically shown in FIG. 2, the DC/DC converter 5 has to maintain a constant current, which is the initial requirement, but its output is switched between different voltages. Flyback converters, well-known by those skilled in the art, can work in discontinuous conduction mode and are thus ideal circuits for that application because the output current is naturally controlled. However, a problem occurring with flyback converters is that they are limited to operate at a few hundred watts because the transformer has to store the total transferred energy during the first part of the switching cycle to restore it to the output on the second part of the switching cycle.

In the invention, during PHASE 2, the stored transformer magnetizing energy is transferred to the output thanks to the magnetizing current reflected to the secondary side of the transformer, this current going through diode DRL. This behaviour is quite similar to the behaviour of a flyback converter. The proposed converter difference compared to a flyback converter is however that the output winding of the transformer is not connected in parallel to the output through DRL but is here in series with CS1. That means that the energy stored in the transformer magnetizing inductance and the energy stored in CS1 are both transferred to the output simultaneously. It can be shown that the output power ($P_O$) of the proposed DC/DC converter is related to the output power ($P_{FB}$) of an equivalent flyback converter by the following equation:

$$P_O = P_{FB}M, \text{ where } M = \frac{V_O}{V_O - NV_{IN}},$$

where $V_{IN}$ and $V_O$ are respectively the input and output voltages of the DC/DC converter. The multiplication factor M is higher than 1. Typical values of M are even higher than 2. The proposed converter has therefore the same advantage as the flyback converter for this application but is able to transfer at least two times the power in the same conditions.

Constant Voltage Constraints Against Semiconductors

The proposed circuit has very special and interesting properties regarding semiconductor maximum stress voltages:

DRL and DR have a working peak voltage of $V_O$.

MP and MAUX have a working peak voltage of $V_O/N$.

The working peak voltage of all semiconductors are therefore independent of $V_{IN}$. This is an ideal situation for large input voltage ranges because the switches are optimally used independently of the input voltage. This is a very seldom property for a DC/DC converter.

Bidirectional Operation

It should be noted that DR and DRL can be replaced by controlled switches such as for example MOSFET's, IGBT's, relays, etc. that are controlled simultaneously with MP and MAUX respectively. In this case, the converter can operate in a bidirectional mode and can transfer power from the right to the left.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A DC-to-AC power converter having a main DC input and a main single-phase AC output, configured to convert and adapt a DC voltage at the main DC input into a sinusoidal AC voltage of a fundamental frequency at the main AC output and to deliver a rated power at the main AC output to a load, comprising:

a single DC-to-DC converter having as input the main DC input and having a DC output and a tank capacitor being connected to the DC output, two low frequency diodes biased so as to be configured to pass current from, respectively to, the DC output to, respectively from, the tank capacitor;

according to a direct path, a bidirectional voltage-type DC-to-AC converter in cascade with the DC-to-DC converter, the bidirectional voltage-type DC-to-AC converter having a DC input-output connected to the DC output and an AC output-input connected to the main AC output;

according to a bypass path, and in parallel to the bidirectional voltage-type DC-to-AC converter and to the low frequency diodes, a current-type low frequency full switching H-bridge comprising an AC forward bridge, having a DC input and an AC output, the DC input being connected to the DC output of the single DC-to- DC converter and the AC output being connected in parallel to the main AC output, the AC forward bridge having a working frequency less than 1 kHz; and a controller configured to control the bidirectional voltage-type DC-to-AC converter to deliver at the first AC output-input the sinusoidal AC voltage and to control the AC forward bridge to deliver a quasi square-type AC forward current in phase with the sinusoidal AC voltage, the control device being configured to control the bidirectional voltage-type DC-to-AC converter and the AC forward bridge, so that the latter are operable simultaneously, wherein, when an instantaneous voltage between the terminals of the main AC output attains a predetermined level, the low frequency forward AC bridge is switched on, the low frequency diodes being reverse biased and non-conducting and a constant power is supplied by the DC-to-DC converter directly to the load.

2. The DC-to-AC power converter according to claim 1, wherein the two closed switches of the low frequency AC forward bridge are selected depending of a polarity of the output AC voltage.

3. The DC-to-AC power converter according to claim 1, wherein the DC-to-DC converter is designed configured to support a variable output voltage while transferring a nearly constant power.

4. The DC-to-AC power converter according to claim 1, wherein the DC-to-DC converter is isolated and comprises, at a primary side of the transformer, an active clamp, comprising a main MOSFET connecting the primary winding of a transformer to a primary source providing the main DC input, a resonance capacitance being in parallel with the primary MOSFET to allow the primary MOSFET to operate in ZVT, and a capacitance and a second MOSFET configured to provide voltage clamping on the main MOSFET and consequently protect the latter against overvoltage.

5. The DC-to-AC power converter according to claim 4, wherein the DC-to-DC converter further comprises, at a secondary side of the transformer, at least a first capacitor creating an AC connection to a secondary winding of the transformer, a resonance inductance that is reducible to a leakage inductance of the transformer, a rectifying diode and a free-wheeling diode configured to rectify a voltage created at the secondary of the transformer and a secondary resonance capacitor connected in parallel with the rectifying diode and a decoupling capacitor in parallel with terminals of the output DC voltage.

6. The DC-to-AC power converter according to claim 5, wherein the first capacitor, the resonance inductance, the rectifying diode, and the free-wheeling diode are configured so that, during a magnetization phase of the transformer, the input voltage of the converter, VIN, reflected to the secondary of the transformer as NVIN, with N being a transformer turn ratio, charges the first capacitor and creates a resonance between the latter and the resonance inductance, through the rectifying diode, the free-wheeling diode being non conducting, and without overvoltage at a junction between the rectifying diode and the free-wheeling diode.

7. The DC-to-AC power converter according to claim 5, wherein the first capacitor, the resonance inductance, the rectifying diode, and the free-wheeling diode are configured so that, during a demagnetization phase of the transformer, a current flows from the charged first capacitor to the load through the resonance inductance and the free-wheeling diode, the current transferring not only a magnetization energy of the transformer but also, simultaneously, an energy stored during the magnetization phase in the first capacitor.

8. The DC-to-AC power converter according to claim 7, wherein an output power ($P_O$) of the DC/DC converter is related to an output power ($P_{FB}$) of an equivalent flyback converter by the following equation:

$$P_O = P_{FB}M, \text{ where } M = \frac{V_O}{V_O - NV_{IN}},$$

wherein $V_{IN}$ and $V_O$ are respectively input and output voltages of the DC/DC converter, M being a multiplication factor higher than 1.

9. The DC-to-AC power converter according to claim 8, wherein M is higher than 2.

10. The DC-to-AC power converter according to claim 1, wherein the DC-to-AC power converter is bidirectional.

11. The DC-to-AC power converter according to claim 1, wherein the DC-to-DC converter is isolated and comprises, at a primary side of the transformer, a two-transistor forward converter primary stage, comprising two MOSFETs, each directly connecting at one respective end thereof an end of the primary winding of a transformer and a respective primary source terminal providing the main DC input, a resonance capacitance being in parallel with each MOSFET respectively, to allow the MOSFETs 4 W operate in ZVT, and diodes arranged to respectively connect each of the main MOSFETs to the primary source terminal which is not the primary source terminal directly connected to the corresponding MOSFET respectively.

12. The DC-to-AC power converter according to claim 1, wherein the AC forward bridge has of a working frequency of 400 Hz or 50/60 Hz.

13. The DC-to-AC power converter according to claim 1, wherein the DC-to-DC converter is non isolated.

14. A DC-to-AC power converter having a main DC input and a main single-phase AC output, configured to convert and adapt a DC voltage at the main DC input into a sinusoidal AC voltage of a fundamental frequency at the main AC output and to deliver a rated power at the main AC output to a load, comprising:

a single DC-to-DC converter having as input the main DC input and having a DC output and a tank capacitor being connected to the DC output, two controlled switches configured to pass current from, respectively to, the DC output to, respectively from, the tank capacitor;

according to a direct path, a bidirectional voltage-type DC-to-AC converter in cascade with the DC-to-DC converter, the bidirectional voltage-type DC-to-AC converter having a DC input-output connected to the DC output and an AC output-input connected to the main AC output;

according to a bypass path, and in parallel to the bidirectional voltage-type DC-to-AC converter and to the low frequency diodes, a current-type low frequency full switching H-bridge comprising an AC forward bridge, having a DC input and an AC output, the DC input being connected to the DC output of the single DC-to-DC converter and the AC output being connected in parallel to the main AC output, the AC forward bridge having a working frequency less than 1 kHz; and a controller configured to control the bidirectional voltage-type DC-to-AC converter to deliver at the first AC output-input the sinusoidal AC voltage and to control the AC forward bridge to deliver a quasi square-type AC forward current in phase with the sinusoidal AC voltage, the control device being configured to control the bidirectional voltage-type DC-to-AC converter and the AC forward bridge, so that the latter are operable simultaneously, wherein, when an instantaneous voltage between the terminals of the main AC output attains a predetermined level, the low frequency forward AC bridge is switched on, the low frequency diodes being reverse biased and non-conducting and a constant power is supplied by the DC-to-DC converter directly to the load.

15. The DC-to-AC power converter according to claim 14, wherein the controlled switches comprise MOSFETs, IGBTs, or relays.

* * * * *